United States Patent [19]

Brasfield et al.

[11] Patent Number: 5,258,972
[45] Date of Patent: Nov. 2, 1993

[54] MAGNETIC DAMPING DISC FOR IMPROVED CD PLAYER PERFORMANCE

[75] Inventors: Mark S. Brasfield, Moss Beach; Larry S. Gullman, LaHonda, both of Calif.

[73] Assignee: MSC Technology Corporation, Moss Beach, Calif.

[21] Appl. No.: 543,269

[22] Filed: Jun. 25, 1990

[51] Int. Cl.⁵ .................. G11B 7/26; G11B 25/04
[52] U.S. Cl. .................. 369/270; 369/283; 369/286; 369/263; 428/65; 430/945
[58] Field of Search ........... 369/270, 271, 273, 274, 369/284, 286, 288, 291, 292, 247, 75.1, 283, 275.5, 263; 360/98.07, 98.08, 99.04, 99.05, 99.08; 428/65, 64; 430/945

[56] References Cited

U.S. PATENT DOCUMENTS

| | | | |
|---|---|---|---|
| 3,651,311 | 3/1972 | Berezin et al. | 235/61.11 D |
| 4,012,048 | 3/1977 | Hawkins | 369/271 |
| 4,121,837 | 10/1978 | Tominari et al. | 369/247 |
| 4,202,551 | 5/1980 | Darnall, Jr. | 369/271 |
| 4,331,966 | 5/1982 | Moe | 369/275.5 |
| 4,415,069 | 11/1983 | Eisemann | 369/75.1 |
| 4,536,865 | 8/1985 | Kenmostu et al. | 369/263 |
| 4,672,600 | 6/1987 | Balston et al. | 369/283 |
| 4,726,007 | 2/1988 | McCormack | 369/286 |
| 5,063,097 | 11/1991 | Hirota et al. | 369/283 X |

FOREIGN PATENT DOCUMENTS

| | | | |
|---|---|---|---|
| 1145267 | 4/1983 | Canada | 369/263 |
| 0132510 | 10/1980 | Japan | 369/263 |

Primary Examiner—Stuart S. Levy
Assistant Examiner—Joseph Rhoa
Attorney, Agent, or Firm—Townsend and Townsend Khourie and Crew

[57] ABSTRACT

A disc (14,24) providing magnetic absorption and mechanical damping is provided which is for mounting near or upon the top of a Compact Disc (100) in position in a CD player. The disc includes one or more layers of material having high magnetic permeability, such as MuMetal. In a specific embodiment, a damping disc is formed of a pair of MuMetal layers on the order of 0.004 inch in thickness separated by a substantially rigid elastomer. The damping disc provides shielding and magnetic loading by absorbing magnetic fields of a player drive motor and arm servo motor to dissipate energy, thereby reducing magnetic field coupling with electronic signal components. The damping disc is mounted on top of a CD (100) and includes a magnetic shielding layer (12) and an acoustic damping layer (16).

7 Claims, 1 Drawing Sheet

MAGNETIC DAMPING DISC FOR IMPROVED CD PLAYER PERFORMANCE

BACKGROUND OF THE INVENTION

This invention relates to enhancement of reproduction quality of audio signals generated from data stored in a digital format on audio Compact Discs or CDs.

An effective CD player is required to optically read the digital data without error. Enhancements which improve the rotational stability of the drive motor, the response to the reflection of the laser or the flatness of the CD itself provide no improvement if the digital error rate is zero.

Mechanical damping to improve reproduction quality of a CD is known. Damping rings, for example "Isodrive" from SymplyPhysics, formed of a flat plastic disc are claimed to improve the performance of the CD player by improving the operation of the drive and optical signal measurement. Since a measurement of the error rate of the CD player indicates that so few errors are not correctable by the digital algorithms, no improvement were expected. However, improvements have been apparent, but the reason for the improvement heretofore has been unexplained. It is the understanding of the source of this serendipitous improvement that provides one basis for the subject invention. Further bases will be apparent hereinafter.

SUMMARY OF THE INVENTION

In accordance with the invention, a device is provided which is for mounting upon the top of a Compact Disc as a disc in position in a CD player to provide magnetic damping, inertial loading and magnetic shielding of the CD player. The device includes one or more layers of material having high magnetic permeability, such as MuMetal. In a specific embodiment, a damping disc is formed of a pair of MuMetal layers on the order of 0.004 inch in thickness separated by a substantially rigid light-weight elastomer. The damping disc provides means for absorbing magnetic fields of a player drive motor and arm servo motor to dissipate energy in the magnetic fields as heat thereby to reduce magnetic field coupling with electronic signal components. Additionally, the damping disc serves to increase the rotational mass to lightly load the drive motor with higher inertia, causing the motor to operate at a more constant drive current and thereby to reduce current spikes and therefore magnetic field spikes due to the speed fluctuations. A multiple magnetic layer disc with light-weight separating layers provides more absorption per unit mass than a solid disc.

Investigative research indicates that system performance is improved by an added disc in three ways. First, by increasing the mass of the rotating CD, the speed is more consistent, and the servo circuits which control speed are subject to smaller current fluctuations, especially at the largest diameter of the CD, where motor speed is the slowest. The quality of audio reproduction is affected by the degree of control exercised in maintaining a closely-controlled disc speed.

Second, a greater improvement is gained by magnetically loading the motor without the addition of mass. Magnetic loading of motors provides many of the same damping characteristics as inertial loading, but without the undesirable effects of excessive additional moving mass.

Third, an improvement is gained by magnetically shielding the motor and servo from the rest of the circuits. A consistent audible improvement in the low frequency audio reproduction quality is observed when a disc is used in accordance with the invention. This improvement can be verified by analysis of the transient signals falling within the low audio frequency range.

Known, commercially-available discs merely provide additional mass, although it may be represented that some other factor is involved, such as improved flatness.

One of the advantages of the invention is the provision of optimal loading of the CD without undue increase in the rotational mass. A disc in accordance with the invention may therefore be provided which is especially well-suited to installation in existing CD players.

The invention will be better understood by reference to the following detailed description in connection with the accompanying drawings.

DESCRIPTION OF SPECIFIC EMBODIMENTS

Figure 1:
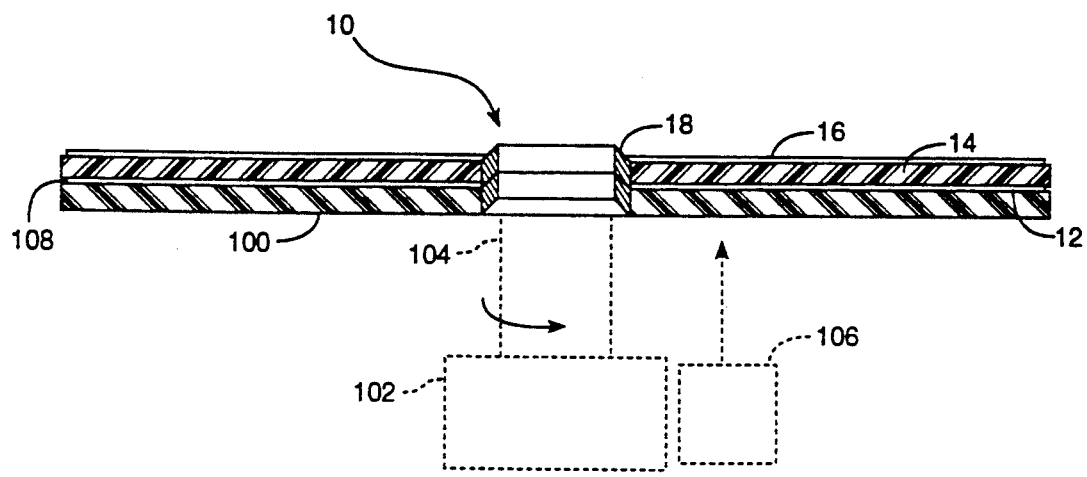
FIG. 1 is a side cross-sectional view of a first embodiment of a damping disc according to the invention.

Referring to FIG. 1, there is shown a cross-section of a damping disc 10 according to the invention. The damping disc 10 comprises three layers as shown in FIG. 1, namely, an annulus 14 of an elastomer or like material which is of sufficient rigidity to support the other layers, a first layer 12 of a high permeability material mounted or otherwise deposited on a first side of the annulus 14, and an acoustic damping film 16 mounted or otherwise deposited on a second side of the annulus 14 opposing the first side. The annulus 14 has a hub 18 mounted in a central hole thereof for facilitating the mounting of the disc 10 to a spindle 104 of a drive motor 102. The drive motor 102 as well as the servo motor 106 which controls the optical head each generate significant magnetic fields due to currents drawn under loading. These magnetic fields, both instantaneous and average, can cause noticeable errors in operation of the neighboring electronic circuitry, giving rise to undesirable degradation of reproduction quality. The magnetic absorption and the mechanical damping provided by the disc 10 serve to minimize the net magnetic field by inertial damping and absorption of stray magnetic fields. The stray magnetic field energy is dissipated in heat in the high permeability material.

The disc 10 is placed in any CD player directly on a CD 100 to be played. (Optionally, the disc 10 is fixedly mounted above the spindle 104 separated from the CD 100 by a gap 108 such that the advantages of magnetic shielding are provided without any additional mechanical loading on the spindle 104.) The layer 12 closest to the noninformation-carrying side of the CD 100 is preferably Mumetal, specifically on the order of 0.010 inch thick or less and more preferably about 0.004 inch thick, to provide magnetic shielding. Alternatively, other magnetic shielding material may be used, such as Permalloy.

The annulus 14 is a polymer substrate to provide flatness and rigidity. The acoustic damping film 16 is preferably a film of standard Isodamp adhesive film available from EAR, Inc.

Figure 2:
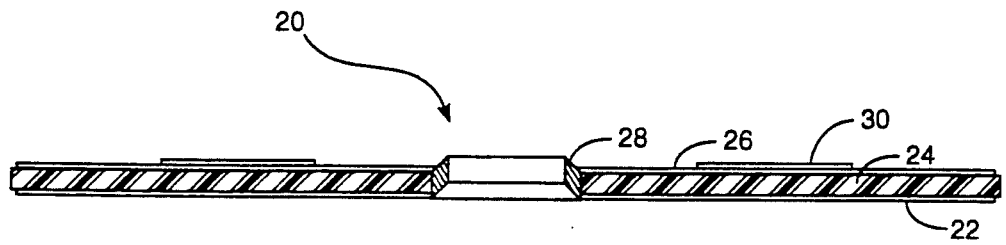
FIG. 2 is a side cross-sectional view of a second embodiment of a damping disc according to the invention.

Referring to FIG. 2, there is shown a cross-section of an alternative embodiment of a damping disc 20 according to the invention. The damping disc 20 comprises four layers as shown in FIG. 2, namely, an annulus 24 of an elastomer or like material which is of sufficient rigidity to support the other layers, a first layer 22 of a high permeability material mounted or otherwise deposited on a first side of the annulus 24, a second layer 26 of a high permeability material mounted or otherwise deposited on a second side of the annulus 24, and an acoustic damping film 30 mounted or otherwise deposited on the second side of the annulus 24 over the second layer 26 opposing the first side. The annulus 24 may for example be formed of Isodamp. The annulus has a hub 28 mounted or formed in a central hole thereof for facilitating the mounting of the disc 20 to a spindle 104 as hereinabove explained. The hub 28 may be constructed of an acoustic damping material to assist in acoustically decoupling the CD 100 from the spindle.

The acoustic damping film 30 is preferably a film of standard Isodamp adhesive film with an inner diameter larger than the hub 28 diameter and an outer diameter smaller than the annulus 24 outer diameter.

The mass of the first layer 22 and the mass of the second layer 26 add to the mass and mechanical damping effect of the disc 20. However, if the mass is substantial, the load of the drive motor 102 is increased, causing a corresponding increase in current and resultant magnetic fields. By the provision of two layers separated by an insulator, the total magnetic absorption effect can be increased without adding to the weight so substantially that the current and field is increased.

Increase in mass has the desired effect of mechanical damping, which decreases pulsatile currents and resultant undesired magnetic fields. However, the nature of the mass increased also affects the field strength. A light disc with maximal magnetic damping due to the use of layers of high permeality materials such as MuMetal provides optimal damping without the undesirable effects of excessive mechanical loading.

The invention has now been described with reference to specific embodiments. Other embodiments will be apparent to those of ordinary skill in the art. For example, the magnetic damping disc may be sheet of irregular shape formed of Isodamp or the like nonmagnetic material coated with MuMetal high permeability material and mounted within or adjacent the CD player, such as on the spindle but separated from the CD to provide magnetic absorption of the ambient magnetic field. Still further, a plurality of discs or sheets can be stacked upon one another or fastened together to improve magnetic damping. Since in this embodiment, the structure is not subject to mass limitations which could adversely affect motor loading, a device of considerable mass may be employed. In view of the foregoing, it is therefore not intended that this invention be limited, except as indicated in the appended claims.

What is claimed is:

1. An apparatus including the combination of an optical disc, a damping disc for absorbing magnetic fields, and an optical disc player, the apparatus comprising:

the optical disc player including a drive motor which drives a spindle, and a servo motor, wherein the drive motor and the servo motor produce magnetic fields;

the damping disc including: an annulus, having a top planar surface and a bottom planar surface, of substantially rigid material mounted to the spindle adjacent a noninformation containing side of the optical disc, the annulus increasing the rotational mass borne by the drive motor; a first layer of a metal of high permeability directly affixed to the bottom planar surface of the annulus adjacent the noninformation containing side of the optical disc, the first layer of metal being disposed entirely within the outer diameter of the annulus; a second layer of the metal directly affixed to the top planar surface of the annulus, and wherein the first and second layers of metal include means for absorbing the magnetic fields produced by the drive and servo motors; and an acoustic damping adhesive film affixed to the second layer of metal, wherein the film includes means for minimizing mechanical vibration of the optical disc resulting from the drive motor; and the optical disc being positioned between: a) the device and servo motors; and b) the dampings disc.

2. A disk as in claim 1 wherein said first and second layers of metal each have a thickness of less than 0.01 inch.

3. The disc according to claim 1 wherein said first layer has a first mass, said second layer has a second mass, and said first and second layers are separated by a first distance, said first mass, second mass and first distance being selected such that the absorption of magnetic fields by said first and second layers exceeds the increase in magnetic fields caused by the load of said first mass and said second mass on said drive motor.

4. The disc according to claim 1 wherein said film is annular having an inner diameter greater than the inner diameter of said annulus and an outer diameter less than the outer diameter of said annulus.

5. An apparatus including the combination of an optical disc, a damping disc for absorbing magnetic fields, and an optical disc player, the apparatus comprising:

the optical disc player including a drive motor which drives a spindle, and a servo motor, wherein both the drive motor and the servo motor produce magnetic fields;

the damping disc including: an annulus, having a top planar surface and a bottom planar surface, of substantially rigid material mounted to the spindle adjacent a noninformation containing side of the optical disc, said annulus increasing the rotational mass borne by the drive motor; a first layer of metal of high permeability directly affixed to the bottom planar surface of the annulus adjacent said noninformation containing side of the optical disc, wherein the first layer of metal is disposed entirely within the outer diameter of the annulus and includes means for absorbing the magnetic fields produced by the drive and servo motors; and an acoustic damping adhesive film directly affixed to the top planar surface of the annulus, wherein the film includes means for minimizing mechanical vibration of the optical disc resulting from the drive motor; and the optical disc being positioned between: a) the drive and servo motors; and b) the damping disc.

6. The disc according to claim 5 wherein said film is annular having an inner diameter greater than the inner diameter of said annulus and an outer diameter less than the outer diameter of said annulus.

7. A disk as in claim 5 wherein said first layer of metal has a thickness of less than 0.01 inch.

* * * * *